(12) United States Patent
Lai et al.

(10) Patent No.: US 10,337,465 B2
(45) Date of Patent: Jul. 2, 2019

(54) DEVICE FOR PRODUCING HYDROGEN BY REFORMING REACTION AND WASTE HEAT

(71) Applicant: Automotive Research & Testing Center, Changhua County (TW)

(72) Inventors: Ming-Pin Lai, Changhua County (TW); Ke-Wei Lin, Changhua County (TW); Chien-Te Lee, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 221 days.

(21) Appl. No.: 15/389,915

(22) Filed: Dec. 23, 2016

(65) Prior Publication Data
US 2018/0179994 A1    Jun. 28, 2018

(51) Int. Cl.
*F01N 3/10* (2006.01)
*F02M 25/12* (2006.01)
*B01J 8/06* (2006.01)
*F01N 5/02* (2006.01)

(52) U.S. Cl.
CPC .............. *F02M 25/12* (2013.01); *B01J 8/065* (2013.01); *B01J 8/067* (2013.01); *F01N 5/02* (2013.01); *B01J 2208/00212* (2013.01); *B01J 2208/065* (2013.01); *F01N 3/10* (2013.01); *F01N 2240/30* (2013.01); *Y02A 50/2322* (2018.01); *Y02T 10/121* (2013.01); *Y02T 10/16* (2013.01)

(58) Field of Classification Search
CPC ........... F02M 25/12; B01J 8/067; B01J 8/065; F01N 5/02
USPC ........................................................ 60/299
See application file for complete search history.

(56) References Cited

U.S. PATENT DOCUMENTS

| | | | |
|---|---|---|---|
| 7,913,654 B2 | 3/2011 | Celis | |
| 2005/0081514 A1* | 4/2005 | Nakada | F01N 3/22 60/286 |
| 2012/0264986 A1* | 10/2012 | Khinkis | B01J 12/007 585/14 |
| 2016/0333286 A1* | 11/2016 | Kudo | C07C 29/50 |

FOREIGN PATENT DOCUMENTS

| CN | 1189652 C | 2/2005 |
|---|---|---|
| CN | 103708418 B | 8/2015 |

* cited by examiner

*Primary Examiner* — Jason D Shanske
(74) *Attorney, Agent, or Firm* — Burris Law, PLLC

(57) ABSTRACT

A hydrogen producing device is mounted at an exhaust gas port of a vehicle to receive exhaust gas and waste heat as a heat source necessary for a reforming reaction with a catalyst member in a reaction chamber. The hydrogen producing device includes a heating chamber in which the reaction chamber is received, a fuel introducing tube disposed to introduce fuel to the reaction chamber, an air introducing tube disposed in the heating chamber to exchange heat with a reaction air thereinto and introducing the reaction air into the reaction chamber for the reforming reaction, and a product discharging tube disposed to discharge a hydrogen-rich synthesis gas generated in the reaction chamber.

10 Claims, 4 Drawing Sheets

DEVICE FOR PRODUCING HYDROGEN BY REFORMING REACTION AND WASTE HEAT

FIELD

The disclosure relates to a hydrogen producing device, and more particularly to a hydrogen producing device which applies waste heat from a vehicle exhaust gas as a reaction heat source to reforming reaction.

BACKGROUND

The problems to be solved by the current transportation industry are how to enhance the efficiency of engine combustion and how to reduce particulate matter (PM) emissions and the particle number (PN) of PM leading to air pollution.

Recently, it has been verified that the hydrogen fuel is a zero-emission fuel and is an optimum energy carrier for a vehicle. The hydrogen fuel can be used with fossil fuels (such as gasoline/diesel, compressed natural gas/liquefied petroleum gas), biomass energy, electrical energy, thermal energy, etc. for energy source conversion.

Generally, hydrogen production may be conducted by virtue of high pressure, a liquid material, a metal material, a chemical process, an electrolytic process, or a reforming reaction. The reforming reaction technology, when applied to engines, is effective in enhance the efficiency of engine combustion and reducing exhaust pollutant emission. Also, considering the fuel cell auxiliary power unit (FC-APU) of a vehicle, this technology can be applied to provide an electric power required during the idling or non-operating period of an engine.

Nowadays, vehicle manufactures have been investigating the application of hydrogen to enhancement of engine efficiency and reduction of exhaust pollutant emission. However, most reforming reaction systems for producing hydrogen are an independent system which is externally installed on a vehicle. Besides, heat required for the reforming reaction process is provided by an additional heat source. Moreover, in the case that a steam reforming (SR) reaction or an autothermal reforming (ATR) reaction is utilized to generate hydrogen, it is needed to significantly increase the volume and weight of fuel solutions, and how to reserve the hydrogen generated and separate oil and water should be taken in account.

SUMMARY

Therefore, an object of the disclosure is to provide a hydrogen producing device that can utilize exhaust gas and heat of a vehicle as a reaction heat source for a reforming reaction.

According to the disclosure, the hydrogen producing device is adapted to be mounted at an exhaust gas port of a vehicle, and includes an outer housing, a reaction unit and a duct unit. The outer housing has a surrounding wall which defines therein a heating chamber that has a primary intake port and a primary outlet port. The primary intake port is in communication with the exhaust gas port to permit exhaust gas and waste heat from the exhaust gas port to flow into the heating chamber and to be discharged through the primary outlet port. The reaction unit includes an inner housing which is disposed in the heating chamber and which defines therein a reaction chamber that is not in communication with the heating chamber, and a catalyst member disposed in the reaction chamber. The duct unit includes a fuel introducing tube, an air introducing tube and a product discharging tube. The fuel introducing tube has a first fuel end disposed in the heating chamber and in spatial communication with the reaction chamber, and extends from the first fuel end and through the surrounding wall to terminate at a second fuel end for connection with a fuel supplying unit so as to introduce fuel from the fuel supplying unit to the reaction chamber. The air introducing tube has an air introducing segment extending through the surrounding wall and into the heating chamber for introduction of reaction air thereinto, a winding segment extending from the air introducing segment and winding around the inner housing, and an extending segment disposed in the heating chamber and extending from the winding segment to terminate at a connecting end that is in spatial communication with the reaction chamber. The product discharging tube has a first product end disposed in the heating chamber and in spatial communication with the reaction chamber, and extends from the first product end and through the surrounding wall to terminate at a second product end.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
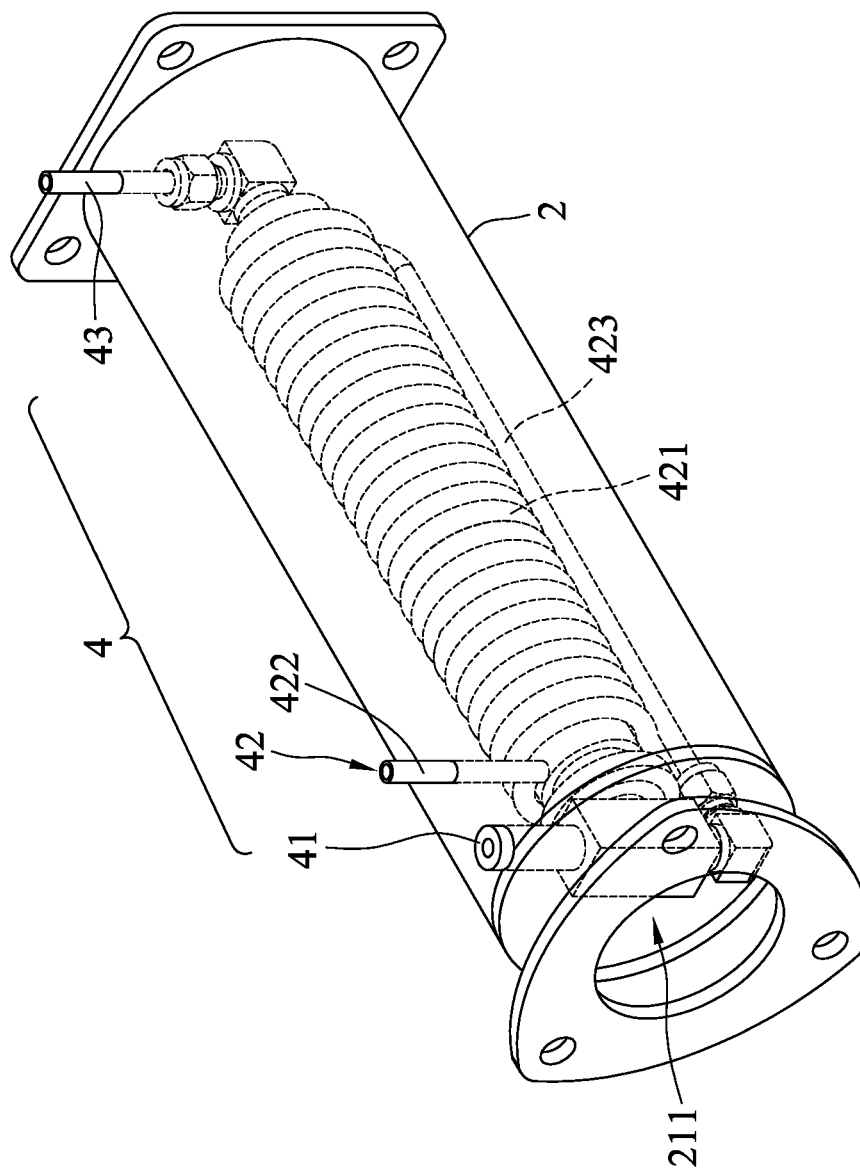
FIG. 1 is a perspective view of an embodiment of a hydrogen producing device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
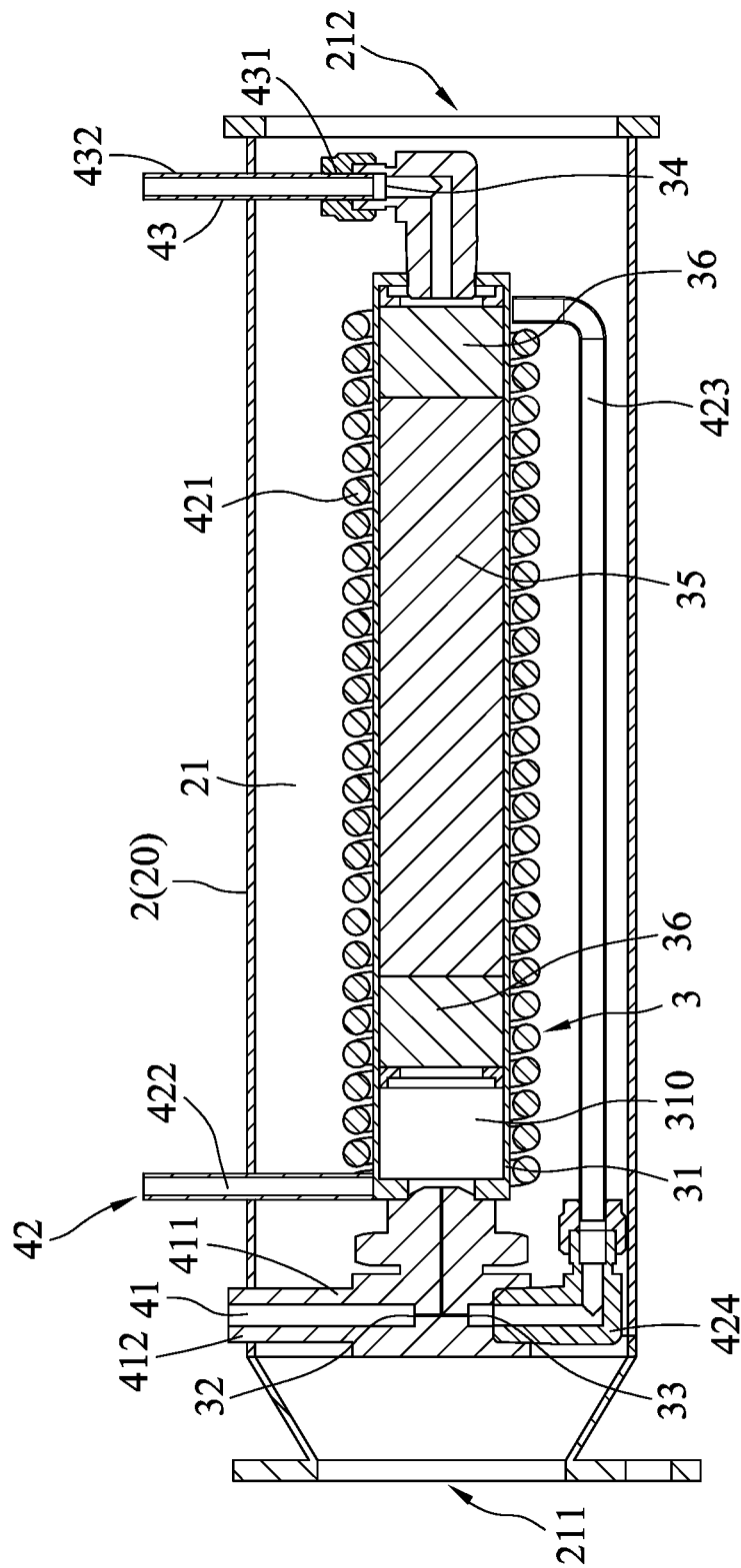
FIG. 2 is a partly sectional view of the embodiment.
Figure 3:
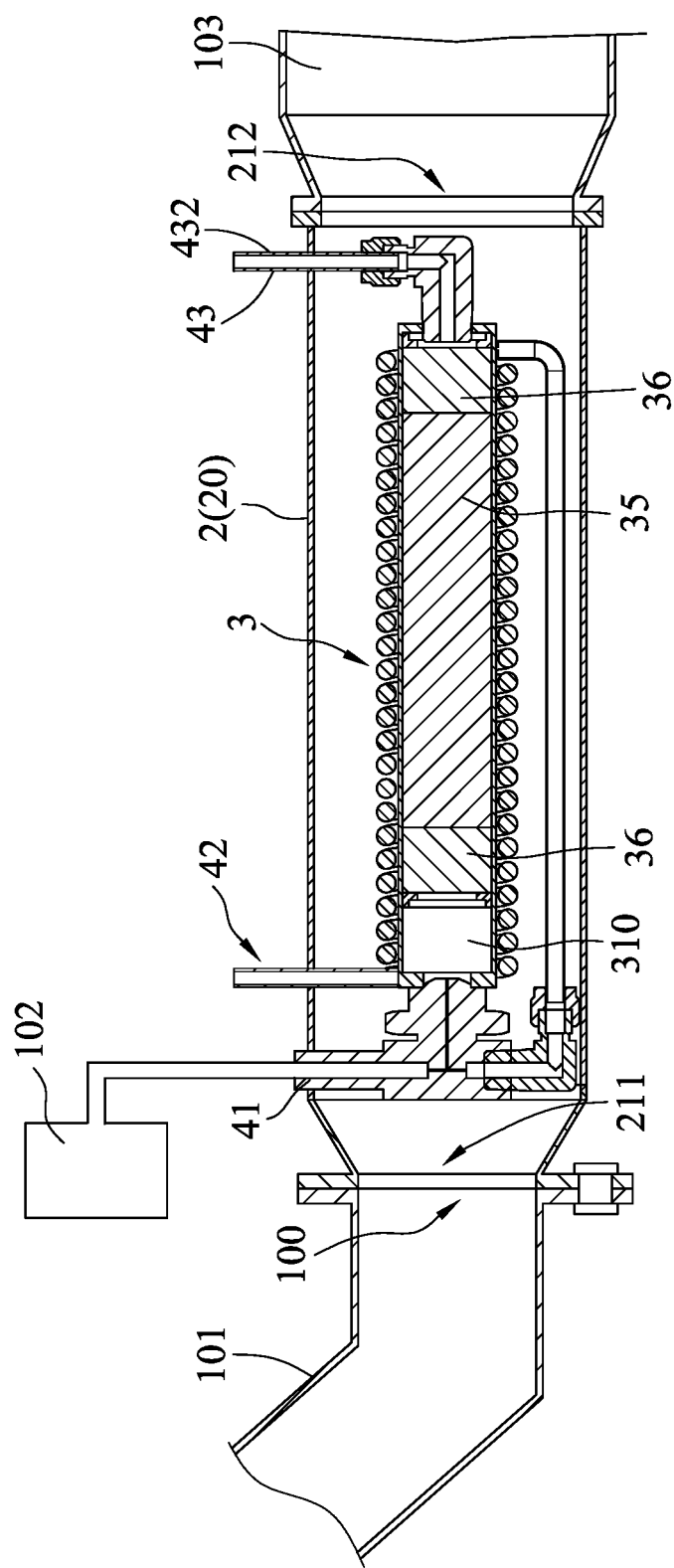
FIG. 3 is a partly sectional view of the embodiment when incorporated with an exhaust gas port, a fuel supplying unit and an exhaust gas after treatment unit of a vehicle.

Referring to FIGS. 1 to 3, an embodiment of a hydrogen producing device according to this disclosure is mounted at an exhaust gas port 100 of a vehicle exhaust pipe 101. The hydrogen producing device includes an outer housing 2, a reaction unit 3 and a duct unit 4.

The outer housing 2 has a surrounding wall 20 which defines therein a heating chamber 21 that extends in a longitudinal direction to terminate at a primary intake port 211 and a primary outlet port 212. The primary intake port 211 can be connected with and in communication with the exhaust gas port 100 to permit exhaust gas and waste heat from the exhaust gas port 100 to flow into the heating chamber 21 and to be discharged through the primary outlet port 212. In this embodiment, the primary intake port 211 is in the form of a flange port so as to be easily mounted on the vehicle exhaust pipe 101 and firmly connected with the exhaust gas port 100.

The reaction unit 3 is disposed in the heating chamber 21, and includes an inner housing 31 which defines therein a reaction chamber 310 that is not in communication with the heating chamber 21, a fuel intake port 32, an air intake port 33, a product outlet port 34, each of which extends through the inner housing 31 to be in communication with the reaction chamber 310, a catalyst member 35 which is disposed in the reaction chamber 310, and two heat stabilizing members 36 which are disposed in the reaction chamber 310 and between which the catalyst member 35 is sandwiched. The heat stabilizing members 36 are disposed proximate to the primary intake port 211 and the primary outlet port 212, respectively.

The fuel intake port 32 and the air intake port 33 are disposed proximate to the primary intake port 211, and the product outlet port 34 is disposed proximate to the primary outlet port 212. In this embodiment, the outer housing 2 and the inner housing 31 are configured as hollow tubes similar to that of the vehicle exhaust pipe 101 such that the primary intake and outlet ports 211, 212 are disposed at two opposite ends of the outer housing 2 in the longitudinal direction for facilitating the assembling in the vehicle. It should be noted that the outer housing 2 and the inner housing 31 can be configured in a different shape to suit for a variety of mounting positions. The catalyst member 35 may be made from a carrier which is coated with noble metal, such as platinum, palladium, rhodium, ruthenium, etc., and which may be granular or honeycomb in shape. In this embodiment, the catalyst carrier is of a granular shape for the purpose of illustration. The heat stabilizing members 36 are made from a porous ceramic material which stabilizes the heat in the reaction chamber 310 for reaction with the catalyst member 35.

The duct unit 4 includes a fuel introducing tube 41, an air introducing tube 42 and a product discharging tube 43. The fuel introducing tube 41 has a first fuel end 411 disposed in the heating chamber 21 and connected with the fuel intake port 32 to be in spatial communication with the reaction chamber 310, and extends from the first fuel end 411 and through the surrounding wall 20 to terminate at a second fuel end 412 for connection with a fuel supplying unit 102 of the vehicle such that fuel is introduced from the fuel supplying unit 102 to the reaction chamber 310 through the fuel introducing tube 41 and the fuel intake port 32. The fuel supplying unit 102 can be a fuel tank of the vehicle, or an external fuel tank mounted outwardly of the vehicle. The fuel supplying unit 102 can be disposed to supply gasoline, diesel or bio fuel. The vehicle can include a diesel engine, and the fuel supplying unit 102 can be a fuel tank for the diesel engine.

The air introducing tube 42 has an air introducing segment 422 which extends through the surrounding wall 20 and into the heating chamber 21 for introduction of reaction air thereinto and which is disposed proximate to the primary intake port 211, a winding segment 421 which spirally extends from the air introducing segment 422 in the longitudinal direction toward the primary outlet port 212 to wind around the inner housing 31, and an extending segment 423 which is disposed in the heating chamber 21 and which extends from the winding segment 421 in the longitudinal direction toward the primary intake port 211 to terminate at a connecting end 424 that is connected with the air intake port 33 so as to spatially communicate the air introducing tube 42 with the reaction chamber 310. The reaction air is introduced into the winding segment 421 through the air introducing segment 422 to perform a heat exchange process with the waste heat in the heating chamber 21, and then enters the reaction chamber 310 through the extending segment 423. In this embodiment, the air introducing tube 42 is made of a highly thermal conductive material to efficiently transfer heat from the heat chamber 21 to the reaction air in the air introducing tube 42.

The product discharging tube 43 has a first product end 431 which is disposed in the heating chamber 21 and which is connected with the product outlet port 34 to be in spatial communication with the reaction chamber 310, and extends from the first product end 431 and through the surrounding wall 20 to terminate at a second product end 432 such that a product generated in the reaction chamber 310 is discharged through the product discharging tube 43.

When the engine of the vehicle is actuated, the exhaust gas and waste heat enters the heating chamber 21 through the primary intake port 211 while the external reaction air is introduced into the air introducing tube 42. With the spiral extension of the winding segment 421 of the air introducing tube 42 (such extension allows the winding segment 421 to wind around the inner housing 31), the transfer route of the reaction air is sufficient to enhance the heat exchange of the reaction air with the waste heat in the heating chamber 21 such that the heat necessary for the reforming reaction in the reaction chamber 310 is sufficiently generated. Meanwhile, the fuel in the fuel supplying unit 102 is introduced into the reaction chamber 310 through the fuel introducing tube 41. The reaction air at high temperature and the fuel are mixed, such that the fuel is partly gasified and a predetermined reaction temperature (e.g., higher than 650° C.) is reached. The reaction mixture is catalyzed by the catalyst member 35 to yield a hydrogen-rich synthesis gas product that is discharged from the product discharging tube 43. The above-mentioned process for partly gasifying the fuel and catalyzing the reaction mixture to generate the hydrogen-rich synthesis gas, as well as the mixing ratio of the fuel supplied by the fuel supplying unit 102 and the reaction air, depends on the molar amount of carbon in the fuel and the molar amount of oxygen in the reaction air, and hence varies with the type of fuel or the oxygen content of the reaction air. Since optimization of the molar ratio of oxygen and carbon is known in the art, a description thereof is dispensed with herein.

It is noted that, in this embodiment, the heat stabilizing members 36 are disposed at two sides of the catalyst member 35, respectively. In other embodiments, only one of the heat stabilizing members 36 can be disposed at either one side of the catalyst member 35. Alternatively, in the case that the inner housing 31 is made with a good heat stabilizing effect, a heat stabilizing member is not required therefor. Moreover, the hydrogen producing device of this embodiment is adapted to be firmly mounted on the vehicle exhaust pipe 101 with its tubular sleeve configuration for receiving the exhaust gas emission of the vehicle so as to reduce pressure loss thereof. Furthermore, the space flow rate of the exhaust gas through the heating chamber 21 is made larger than the maximum flow rate of the exhaust emission of the engine, which can maintain the back pressure of the exhaust emission of the engine.

In the case that the hydrogen producing device of this embodiment is used with a vehicle having a diesel engine, the fuel supplying unit 102 is a fuel tank of the diesel engine to supply diesel or bio fuel for a compression ignition engine. Moreover, the product discharging tube 43 can be further connected with a component of the vehicle for performing different effects. For example, the product discharging tube 43 can be connected with at least one of the engine of the vehicle, an exhaust gas aftertreatment unit 103 of the vehicle, and an onboard fuel cell auxiliary power unit of the vehicle.

Specifically, in the case that the second product end 432 of the product discharging tube 43 is connected to the engine of the vehicle to introduce the hydrogen-rich synthesis gas thereinto, the fuel in the engine can be blended with the hydrogen-rich synthesis gas to operate the engine in an ultra-lean burn mode so as to enhance the efficiency of fuel combustion in the engine, and reduce fuel consumption and exhaust pollutant emission.

In the case that the second product end 432 of the product discharging tube 43 is connected with the exhaust-gas aftertreatment unit 103 which is connected with the primary outlet port 212 to receive the exhaust gas in the heating chamber 2l, the hydrogen-rich synthesis gas discharged from the product discharging tube 43 can assist the exhaust gas after treatment unit 103 in terms of the regeneration technology. For example, the hydrogen-rich synthesis gas together with the exhaust gas after treatment unit 103 can increase the temperature of the exhaust gas so as to enhance the regeneration effect of a diesel particulate filter (DPF) or the conversion efficiency of nitrogen oxides in a selective catalytic reduction (SCR) system in a cold start and low temperature state, thereby efficiently regulating the exhaust pollutant emission of the vehicle.

In the case that the second product end 432 of the product discharging tube 43 is connected with the onboard fuel cell auxiliary power unit, the hydrogen-rich synthesis gas discharged from the product discharging tube 43 can serve as a reaction gas for the onboard fuel cell auxiliary power unit.

Figure 4:
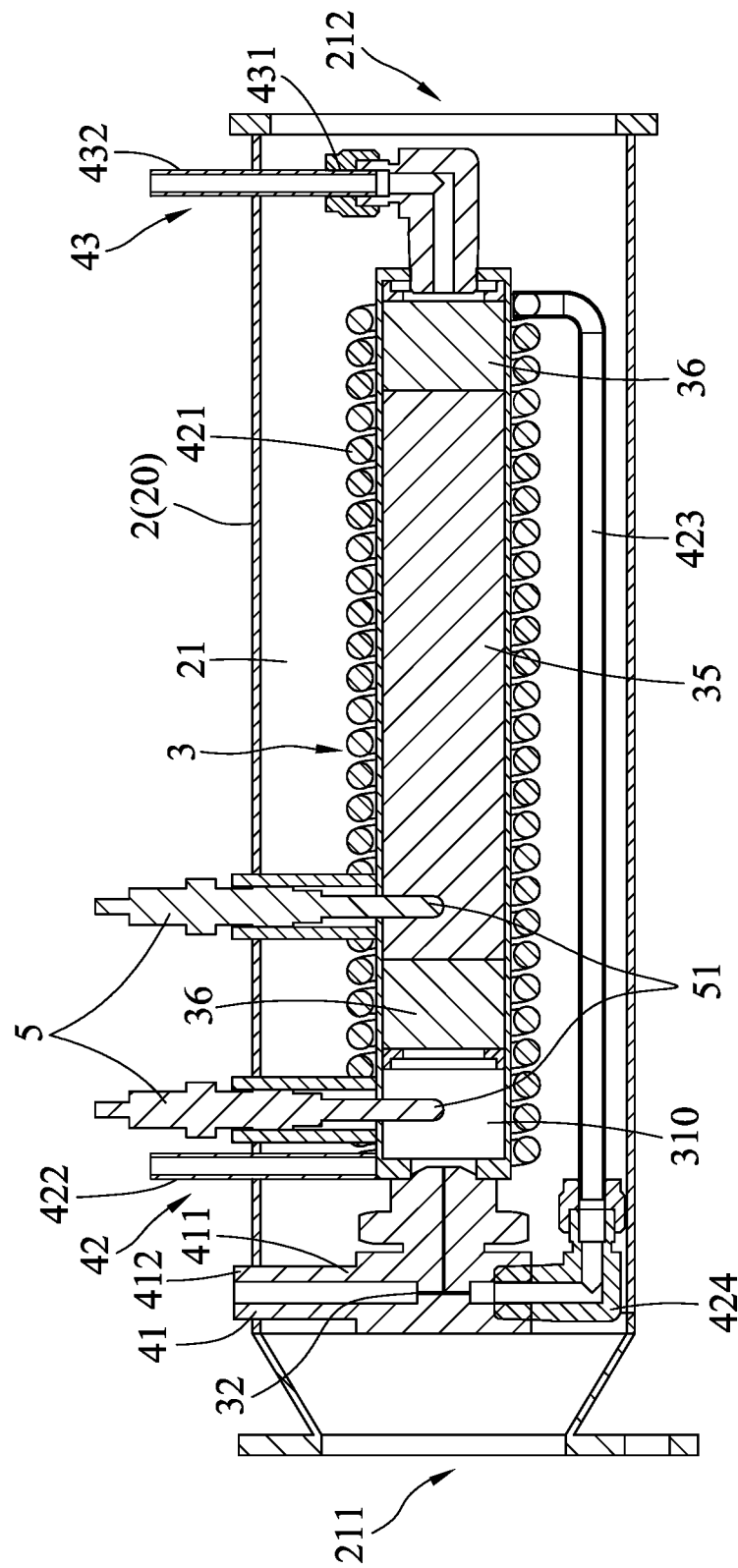
FIG. 4 is a partly sectional view of another embodiment of a hydrogen producing device according to the disclosure.

Referring to FIG. 4, another embodiment of the hydrogen producing device according to this disclosure further includes at least one preheating members (two preheating members 5 are provided in this embodiment as illustrated in FIG. 4). Each of the preheating members 5 extends through the surrounding wall 20 and into the heating chamber 21 and has a heating segment 51 which is disposed to extend into the reaction chamber 310 to supply heat thereto. In this embodiment, one of the heating segments 51 is located between the heat stabilizing member 36 proximate to the primary intake port 211 and the fuel intake port 32, and the other one of the heating segments 51 is located between the two heat stabilizing members 36 and directly contact the catalyst member 35. By virtue of the preheating members 5, heat necessary for the reforming reaction can be supplied to the reaction chamber 310 when the engine is not started or the reaction chamber 310 has insufficient reaction temperature, so as to ensure stability of the flow rate of the hydrogen-rich synthesis gas. Hence, the hydrogen producing device of this embodiment can generate the hydrogen-rich synthesis gas when the engine is not initiated.

As illustrated, the hydrogen producing device of this disclosure is adapted to be mounted at an exhaust gas port 100 of a vehicle to utilize exhaust gas of the vehicle as a heat source necessary for a reforming reaction, and can be supplied with a fuel from the fuel supplying unit 102 of the vehicle to react the fuel with the reaction air for yielding a hydrogen-rich synthesis gas. The reaction temperature in the reaction chamber 310 can be reliably maintained by means of the heat stabilizing members 36. Moreover, with the space flow rate of the exhaust gas larger than the maximum flow rate of the exhaust emission of the engine, the back pressure of the exhaust emission of the engine is not adversely affected. Furthermore, the preheating member 5 can be provided to supply heat necessary for the reforming reaction with the catalyst member 35 when the engine is not started or the reaction chamber 310 has insufficient reaction temperature.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hydrogen producing device adapted to be mounted at an exhaust gas port of a vehicle, comprising:
    an outer housing having a surrounding wall which defines therein a heating chamber that has a primary intake port and a primary outlet port, said primary intake port being in communication with the exhaust gas port to permit exhaust gas and waste heat from the exhaust gas port to flow into said heating chamber and to be discharged through said primary outlet port;
    a reaction unit including an inner housing which is disposed in said heating chamber and which defines therein a reaction chamber, and a catalyst member disposed in said reaction chamber; and
    a duct unit including
        a fuel introducing tube which has a first fuel end disposed in said heating chamber and in spatial communication with said reaction chamber, and which extends from said first fuel end and through said surrounding wall to terminate at a second fuel end for connection with a fuel supplying unit so as to introduce fuel from the fuel supplying unit to said reaction chamber,
        an air introducing tube which has an air introducing segment extending through said surrounding wall and into said heating chamber for introduction of reaction air thereinto, a winding segment extending from said air introducing segment and winding around said inner housing, and an extending segment disposed in said heating chamber and extending from said winding segment to terminate at a connecting end that is in spatial communication with said reaction chamber, and
        a product discharging tube which has a first product end disposed in said heating chamber and in spatial communication with said reaction chamber, and which extends from said first product end and through said surrounding wall to terminate at a second product end.

2. The hydrogen producing device as claimed in claim 1, further comprising at least one preheating member which extends through said surrounding wall and into said heating chamber and which has a heating segment that is disposed to extend into said reaction chamber to supply heat to said reaction chamber.

3. The hydrogen producing device as claimed in claim 1, wherein said surrounding wall extends in a longitudinal direction to terminate at said primary intake port and said primary outlet port, said reaction unit further including a fuel intake port which is disposed to intercommunicate said first fuel end of said fuel introducing tube and said reaction chamber, an air intake port which is disposed to intercommunicate said connecting end of said air introducing tube and said reaction chamber, and a product outlet port which is disposed to intercommunicate said reaction chamber and said first product end of said product discharging tube, said fuel intake port and said air intake port being disposed proximate to said primary intake port, said product outlet port being disposed proximate to said primary outlet port.

4. The hydrogen producing device as claimed in claim 3, wherein said reaction unit further includes two heat stabilizing members which are disposed in said reaction chamber and between which said catalyst member is sandwiched, said heat stabilizing members being disposed proximate to said primary intake port and said primary outlet port, respectively, and being made from a porous ceramic material.

5. The hydrogen producing device as claimed in claim 3, wherein said air introducing segment is disposed proximate to said primary intake port, said winding segment spirally extending from said air introducing segment in the longitudinal direction toward said primary outlet port, said extending segment extending from said winding segment in the longitudinal direction toward said primary intake port to have said connecting end connected with said air intake port.

6. The hydrogen producing device as claimed in claim 3, wherein said second product end of said product discharging tube is connected to an engine of the vehicle.

7. The hydrogen producing device as claimed in claim 3, wherein the vehicle includes an exhaust-gas after-treatment unit for connection with said primary outlet port to receive the exhaust gas in said heating chamber, said second product end of said product discharging tube being connected with the exhaust-gas after-treatment unit.

8. The hydrogen producing device as claimed in claim 3, wherein the vehicle includes a fuel cell auxiliary power unit, said second product end of said product discharging tube being connected with the fuel cell auxiliary power unit.

9. The hydrogen producing device as claimed in claim 1, wherein the fuel supplying unit is disposed to supply diesel or bio fuel.

10. The hydrogen producing device as claimed in claim 1, wherein the vehicle includes a diesel engine, and the fuel supplying unit is a fuel tank of the diesel engine.

* * * * *